United States Patent [19]

Schwerdt

[11] Patent Number: 5,024,425
[45] Date of Patent: Jun. 18, 1991

[54] ELASTOMERIC SLEEVE SPRING

[75] Inventor: Hans-Werner Schwerdt, Laudenbach, Fed. Rep. of Germany

[73] Assignee: Firma Carl Freudenberg, Weinheim/Bergstr., Fed. Rep. of Germany

[21] Appl. No.: 471,181

[22] Filed: Jan. 26, 1990

[30] Foreign Application Priority Data

Feb. 24, 1989 [DE] Fed. Rep. of Germany ....... 3905686

[51] Int. Cl.$^5$ .......................................... F16F 13/00
[52] U.S. Cl. .................. 267/140.1; 180/312; 248/562; 248/636; 267/141.1; 267/141.2; 267/293; 267/294
[58] Field of Search ............... 267/140.1 R, 140.1 C, 267/140.3, 140.4, 141.1, 141.2, 293, 292, 294, 219, 220; 180/300, 312, 902; 248/562, 636

[56] References Cited

U.S. PATENT DOCUMENTS

| 4,286,777 | 9/1981 | Brown | 267/141.1 X |
| 4,756,514 | 7/1988 | Kanda | 248/562 X |
| 4,840,359 | 6/1989 | Hamaekers et al. | 267/292 X |

FOREIGN PATENT DOCUMENTS

| 20790 | 1/1981 | European Pat. Off. | 267/141.2 |
| 3046419 | 7/1982 | Fed. Rep. of Germany . | |
| 3722079 | 1/1988 | Fed. Rep. of Germany | 248/562 |
| 2305646 | 10/1976 | France | 267/141.2 |
| 2333163 | 6/1977 | France | 267/294 |
| 172743 | 9/1985 | Japan | 267/140.1 |
| 46036 | 2/1987 | Japan | 267/140.1 |

Primary Examiner—George E. A. Halvosa
Attorney, Agent, or Firm—Felfe & Lynch

[57] ABSTRACT

Rubber sleeve spring with an hydraulic damping, including two connecting pieces which enclose one another in a relationship parallel to their axes and are radially spaced apart and, in which, in the gap formed by this space, there are two spring bodies successively disposed in radial direction and preferably made of a rubber elastic material of which the external spring body encloses liquid filled chambers with a basically cross-like configured profile. At least two chambers of the external spring body which are opposite to one another are connected via a dampening opening and an intermediate mass is provided between the external and the internal spring body. The intermediate mass comprises two opposing half shells 7.1, 7.2 associated with the vertical center plane of the external spring body 4 in a mirror-inverted relationship. The half shells 7.1, 7.2 and the external spring body 4 are permanently attached to each other and the internal spring body 3 is pressed into the free space which is enclosed by the half shells 7.1, 7.2 while the external spring body 4 is radially pressed together.

1 Claim, 2 Drawing Sheets

ELASTOMERIC SLEEVE SPRING

The invention relates to an elastomeric, preferably rubber, sleeve spring.

A rubber sleeve spring of this general type is known from the German OS 30 46 419. The intermediate mass as well as the connecting pieces thereof are annularly closed, rigidly configured and attached to the spring bodies by means of heat vulcanization. The cooling phase following the vulcanization of the spring bodies causes internal strains in the spring bodies. The service life and the insulation of acoustically effective, high-frequency vibrations are hence little satisfactory.

It is an object of the invention to further develop a rubber sleeve spring of this type such that service life and damping of acoustically effective, high-frequency vibrations are improved.

In the rubber sleeve spring in accordance with the invention the intermediate mass includes two opposing half shells which are associated with the profile of an external spring body in a mirror-inverted relationship. The half shells and the external spring body are permanently connected to one another and while radially pressing together the external spring body, an internal spring body is pressed in axial direction into the free space which is enclosed by the half shells. Tensile forces in the spring bodies of the rubber sleeve spring in accordance with the invention are thus completely avoided and the service life is significantly improved. Using an intermediate mass in the form of half shells also permits elastically bracing the two series-connected spring bodies against each other; consequently, the damping of acoustically effective, high frequency vibration is improved.

The spring bodies can be made of different kinds of rubber having different resilient elasticities so as to further improve their resilient properties. In this respect, it proved advantageous when the internal spring body is made of a rubber with particularly distinctive vibration characteristics and when the external vibration body is made of a rubber with particularly low damping characteristics.

The rubber sleeve spring in accordance with the invention includes two independently movable intermediate masses permitting an independent configuration and achieving damping effects in two different frequency ranges. In addition, this includes the possibility of a channel-like configuration of a connecting opening between the liquid-filled chambers and of a dimension of the connection such that in an additional frequency range, the liquid volume which is enclosed by the connecting opening is made to resonate which then, consequently, has another damping effect.

The latter as well as the other aforesaid effects for damping vibrations can be used for suppressing particularly interfering frequencies. Definitions of the latter are known.

The spring body can be configured in the intermediate chamber of the half shells by a membrane-like buffering wall which is spaced apart form the internal spring body in at least the center area of its circumferential extension. The so-formed space is advantageously filled with air and connected to the atmosphere which supports a decoupling of acoustically effective, high-frequency vibrations which are introduced in the rubber sleeve spring transversely to the extension of the buffering wall.

A further embodiment suggests that in the area of the half shells, the external spring body is provided with stopping buffers which are configured as one piece and protrude into the chambers and that the stopping buffers are associated with the symmetrical axis of the rubber sleeve spring in a mirror-inverted relationship. This effectively anticipates an overstressing. Advantageously, the symmetrical axis extends parallel to the stress direction and through the center of one opposing pair of chambers.

A guiding element can be associated with the half shells at least at one end. The aforesaid guiding element is attached to the connecting part which supports the internal spring body at the inside. This effectively anticipates a particularly undesired large relative displacement of the two connecting parts in axial direction.

It proved to be particularly advantageous when such a guiding element is provided with a flange-like configuration and an annular projection which externally surrounds the half shells. The size of the escape movement which is determined by use can thus be restricted to a certain value; this is advantageous for certain applications. Advantageously, corresponding guiding elements are provided at both ends of the rubber sleeve spring; during the intended use, they simultaneously prevent a relative displacement of the internal spring body with respect to the external spring body.

The half shells can have a basically annular segment-like profile which is associated with the symmetrical axis in a mirror-inverted relationship according to the aforesaid explanations. The angle of the appertaining annular segment is advantageously 90° to 160°.

In accordance with the invention, an elastomeric sleeve spring with an hydraulic damping comprises two circumferential connecting pieces having parallel axes and one enclosing the other in a relationship parallel to their axes and the connected pieces being radially spaced apart forming a gap therebetween. In the gap external and internal spring bodies are successively disposed in a radial direction and are made of an elastomeric material of which the external spring body encloses a plurality of liquid-filled chambers with a basically cross-like configured profile. The external spring body has a damping opening connecting at least two chambers of the external spring body which are opposite to one another. An intermediate mass is provided between the external and the internal spring body. The intermediate mass includes two opposing half shells which are associated with a profile of the external spring body in a mirror-inverted relationship. The half shells and the external spring body are permanently attached to each other. The half shells enclose a free space and the internal spring body is pressed into the free space while the half shells radially press together the external spring body.

For a better understanding of the invention, together with other and further objects thereof, reference is made to the following description, taken in connection with the accompanying drawings, and its scope will be pointed out in the appended claims.

Referring now to the drawings.

Figure 1:
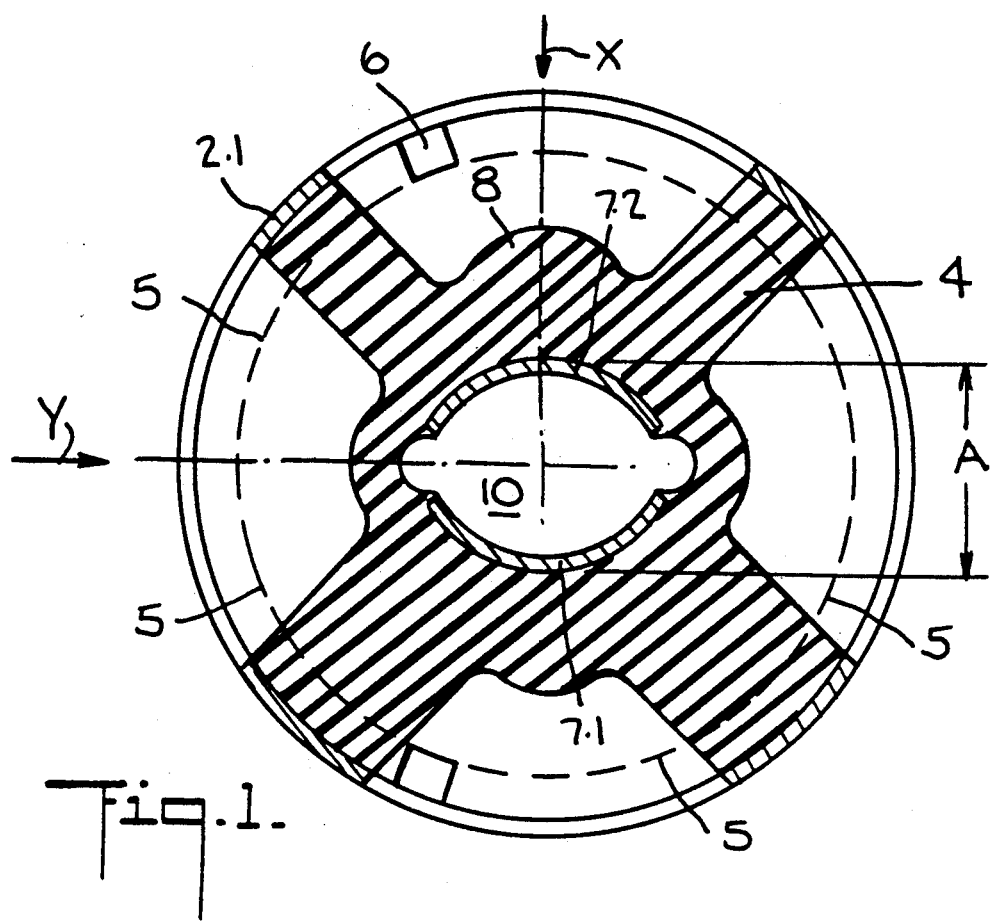
FIG. 1 is a cross sectional view of the external spring body which is attached to a part of the external connecting piece by means of vulcanization; in the area of its internal diameter, this external spring body has in addition two half shells which are attached by means of vulcanization.
Figure 2:
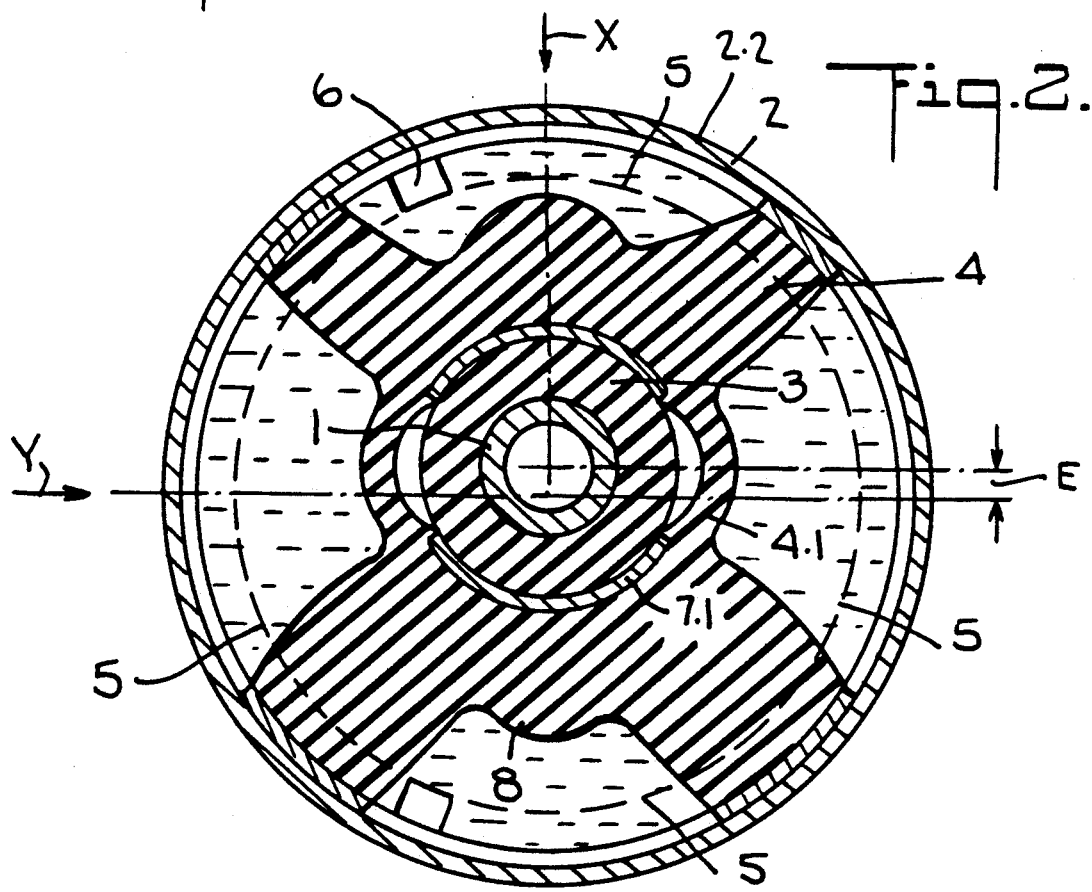
FIG. 2 is a cross sectional view of the part of FIG. 1 as it is ready for use.
Figure 3:
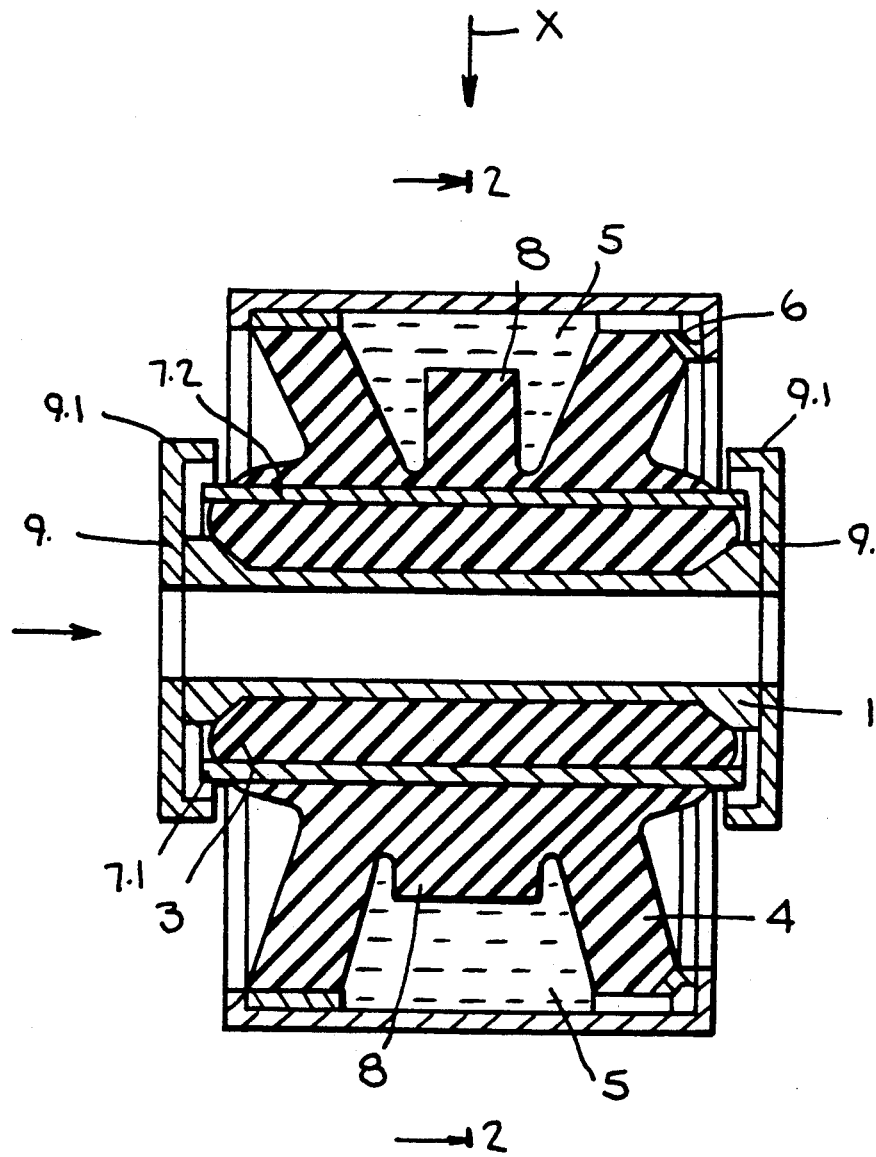
FIG. 3 is a longitudinal section of the rubber sleeve spring according to FIG. 2.

The rubber sleeve springs shown in FIGS. 1 to 3 include two enclosing connecting pieces 1, 2 which are associated with one another parallel to their axes and are radially spaced apart; in the gap formed by the space in radial direction two successive spring bodies 3, 4 are provided which are preferably made of a rubber elastic material. The external spring body 4 thereof encloses liquid-filled chambers 5 with a basically cross-like configured profile; the chambers of the external spring bodies 4 which are opposite to one another in X-direction are connected via a channel-like configured damping opening 6 and an intermediate mass 7.1, 7.2 is provided between the external and the internal spring body 4, 3. The intermediate mass 7.1, 7.2 includes the two half shells 7.1 and 7.2 which are associated with an imaginary, vertically extending plane in a mirror-inverted relationship and are permanently attached to the external spring body 4, preferably while the latter is shaped and solidified by means of vulcanization. After solidification of the spring body 4, the half shells 7.1 and 7.2 are spaced apart from one another in the symmetrical plane by the distance A. When manufactured, the external spring body 4 and the half shells 7.1 and 7.2 have the profile as shown in FIG. 1. In addition to the aforesaid features, the profile of the spring body 4 has stopping buffers 8 which are provided inside the circumferential extension of the half shells 7.1 and 7.2; together with the external spring body 4, the buffers are configured as one piece. The profile thereof is basically annular segment-like defined and associated with the symmetrical plane of the rubber spring sleeve in a mirror-inverted relationship. At the same time, the symmetrical plane separates the successively disposed chambers in their centers in X-direction, i.e. in stress direction.

In the intermediate zones of the half shells 7.1 and 7.2, the walls which define the external spring body 4 are configured as membrane-like, thinly formed buffering walls 4.1 and are radially arcuate toward the exterior. The profile given during manufacture can basically be described as semicircular.

The external connecting piece 2 is made of two pieces and includes in addition to a closed cylindrical external tube 2.2 a windowed tube 2.1 which can be inserted inside the external tube 2.2 so as to be liquid-tight and, in the area of the chambers 5, is provided with openings which are radially open towards the exterior. Moreover, the windowed tube 2.1 surrounds the inlet and the outlet of the damping opening 6 as well as a part of the profile thereof over the entire length (FIG. 3). The profile does not change and the dampening opening is hence channel-like configured and the liquid contained therein can be made to resonate when vibrations of a certain frequencies are introduced.

The internal spring body 3 is tube-like configured and supported on the pipe-like, internal connecting piece 1 represented in FIG. 3. Once inserted in the free space 10 which is enclosed by the half shells 7.1, 7.2, it causes a parting movement of the latter and also a compressive prestress in the internal as well as in the external spring body; this is illustrated in the drawing in the area of the external spring body through an expansion of the cross pieces. The cross pieces of the external spring body 4 which are disposed in the lower area have a larger extension in circumferential direction than the cross pieces disposed in the upper area. When inserting the internal spring body this results in the area of the lower cross pieces in a lower, radial compression with respect to the upper cross pieces and in an upward relative displacement of the axis of the internal connecting piece 1 by the value E. The latter is selected such that there is in an almost complete resetting into a centered position when the intended load is applied. Subsequently, the relative mobility of the connecting pieces 1, 2 is thus identical in any desired direction. The buffering walls 4.1 of the external spring body 4 are subject to a flattening of their originally semicircular profile. Between the side which is radially directed toward the inside and the external side of the internal spring body 3, however, there continues to be an air-filled space in at least the center area.

The windowed tube 2.1 is advantageously inserted in the liquid-impermeable external tube 2.2 of the external connecting piece while being immersed. This ensures that the chambers 5 and the dampening opening 6, are completely filled with liquid following the assembly. Subsequently, at the end which axially extends over the dampening opening 6 the external tube 2.2 is radially beaded toward the interior as shown in FIG. 3. The liquid which is contained in chambers 5 and the dampening opening 6 is thus hermetically sealed and the rubber sleeve spring is basically ready for use.

In addition the half shells 7.1 and 7.2 are at both ends enclosed by guiding elements 9 which are attached to the connecting piece 1 which supports the internal spring body 3 at the inside. The guiding elements 9 are of a flange-like configuration and provided with annular projections 9.1 which spaced-apart enclose the half shells (FIG. 3).

The following can be said with regard to the properties of the aforesaid rubber sleeve spring:

The rubber sleeve spring is distinguished by particularly good insulating properties regarding acoustically effective vibrations which are introduced in X- and/or Y-direction; this is achieved by a good resilience in a lateral direction of the cross pieces and the buffering walls 4.1 which basically form the external spring body 4.

With regard to vibrations of an amplitude of more than 1 mm which are introduced in Y-direction, the rubber sleeve spring is distinguished by a great strength which permits transmitting guiding forces in this direction in a particularly advantageous way.

With regard to vibrations of an amplitude of more than 1 mm which are introduced in X-direction, there is a limited resilience caused by an excellent damping effect of the liquid volume which changes position in the dampening opening during such operating conditions as well as an independent relative movability of the inertia mass which is formed by the half shells 7.1 and 7.2 and resiliently supported in radial direction toward the exterior as well as toward the interior.

While there has been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Elastomeric sleeve spring with an hydraulic damping, comprising:

two circumferential connecting pieces having parallel axes and one enclosing the other in a relationship parallel to their axes and the connecting pieces being radially spaced apart forming a gap therebetween;

in the gap two external and internal spring bodies successively disposed in a radial direction and made of an elastomeric material of which the external spring body encloses a plurality of liquid-filled chambers with a basically cross-like configured profile;

the external spring body having a damping opening connecting at least two chambers of the external spring body which are opposite to one another;

an intermediate mass being provided between the external and the internal spring bodies, the intermediate mass including two opposing half shells which are associated with a profile of the external spring body in a mirror-inverted relationship, the half shells and the external spring body being permanently attached to each other;

the half shells enclosing a free space and the internal spring body being pressed into the free space while radially pressing together the external spring body;

the sleeve spring including a guiding element and at least at one end the half shells being associated with the guiding element, the guiding element being attached to a connecting piece which supports the internal spring body at its inside; and the guiding element being flange-like configured and having an annular projection, the annular projection externally enclosing the half shells.

* * * * *